US005517253A

United States Patent [19]

De Lange

[11] Patent Number: 5,517,253

[45] Date of Patent: May 14, 1996

[54] MULTI-SOURCE VIDEO SYNCHRONIZATION

[75] Inventor: Alphonsius A. J. De Lange, Eindhoven, Netherlands

[73] Assignee: U.S. Philips Corporation, New York, N.Y.

[21] Appl. No.: 335,805

[22] PCT Filed: Mar. 29, 1994

[86] PCT No.: PCT/NL94/00068

§ 371 Date: Nov. 14, 1994

§ 102(e) Date: Nov. 14, 1994

[87] PCT Pub. No.: WO94/23416

PCT Pub. Date: Oct. 13, 1994

[30] Foreign Application Priority Data

Mar. 29, 1993 [EP] European Pat. Off. .............. 93200895

[51] Int. Cl.[6] .................................................... H04N 5/073

[52] U.S. Cl. .......................... 348/513; 348/514; 348/571; 348/584

[58] Field of Search .................................... 348/513, 514, 348/511, 523, 571, 584, 714, 715, 512, 716; 345/119, 213; H04N 9/46, 5/04, 5/073

[56] References Cited

U.S. PATENT DOCUMENTS

| | | | |
|---|---|---|---|
| 4,101,926 | 7/1978 | Dischert et al. | 348/514 |
| 4,134,131 | 1/1979 | Hopkins, Jr. | 348/513 |
| 4,218,710 | 8/1980 | Kashigi et al. | 348/571 |
| 4,249,198 | 2/1981 | Ito et al. | 358/13 |
| 4,445,135 | 4/1984 | Heitman et al. | 348/514 |
| 4,766,506 | 8/1988 | Yagi et al. | 360/37.1 |
| 4,797,743 | 1/1989 | Miyazaki | 358/149 |
| 4,907,086 | 3/1990 | Truong | 348/584 |
| 4,947,257 | 8/1990 | Fernandez et al. | 358/734 |
| 5,068,650 | 11/1991 | Fernandez et al. | 340/799 |
| 5,283,561 | 2/1994 | Lumelsky et al. | 340/721 |
| 5,351,129 | 9/1994 | Lai | 348/584 |

FOREIGN PATENT DOCUMENTS 92203879 11/1992 European Pat. Off. .

OTHER PUBLICATIONS

"A New Era of Fast Dynamic RAMs", IEEE Spectrum, pp. 43–49, Oct. 1992.

"Low-cost Display Memory Architectures for Full-motion Video and Graphics", A. A. J. de Lange and G. D. La Hei, IS&T/SPIE High-Speed Networking and Multimedia Computing Conference, San Jose, USA, Feb. 6–10, 1994.

*Primary Examiner*—Safet Metjahic
*Assistant Examiner*—Glenton B. Burgess
*Attorney, Agent, or Firm*—Edward W. Goodman

[57] ABSTRACT

A system for synchronizing input video signals from a plurality of video sources includes a plurality of buffering units (B1 . . . BN) each coupled to receive a respective one of the input video signals. The buffering units have mutually independent read and write operations. Each buffer write operation is locked to the corresponding video input signal. Each buffer read operation is locked to a system clock. The buffering units are substantially smaller than required to store a video signal field. The system further includes a storage arrangement (DRAM-1 . . . DRAM-M) for storing a composite signal composed from the input video signals, and a communication network (110) for communicating data from the buffering units to the storage arrangement, pixel (X) and line (Y) addresses of the buffering units and of the storage arrangement being coupled.

6 Claims, 5 Drawing Sheets

MULTI-SOURCE VIDEO SYNCHRONIZATION

The invention relates to multi-source video synchronization.

BACKGROUND OF THE INVENTION

1. Field of the Invention

Several unrelated video signals cannot be processed correctly in a single video effects system or displayed on a monitor, without being synchronized first. Namely, each video signal contains line and field synchronization pulses, which are converted to horizontal and vertical deflection signals for a monitor on which the video signal is displayed. The major problem is that the line and field synchronization pulses contained in the different video signals do not occur at the same time. If one of the video signals is used as reference signal, that is the horizontal and vertical deflection signals for a display are derived from this signal, then the following artifacts may appear:

Images that are represented by the other video signals (called the subsignals) will be shifted spatially on the display with regard to the reference signal.

Odd and even video fields in the subsignals may be interchanged which gives rise to visual artifacts like jagged edges and line flicker.

In case line and field frequencies of the video subsignals differ from the reference video signal, then the images represented by these subsignals will crawl across the screen.

Finally, so-called cut-line artifacts may become visible, i.e., different parts of the same displayed image originate from different field/frame periods, which can be rather annoying in moving images where some parts of moving objects seem to lag behind.

2. Description of the Related Art

Traditionally, video synchronizers are built with frame stores that are capable to delay video signals from a few samples to a number of video frame periods. One of these video signals is selected as a reference signal and is not delayed. All samples of the other signals are written into frame stores (one store per signal) as soon as the start of a new frame is detected in these signals. When the start of a new frame in the reference video signal is detected, the read-out of the frame memory is initiated. This way, the vertical synchronization signals contained in the reference and other video signals appear at the same time at the outputs of the synchronization module.

FIG. 1 illustrates synchronization of a video signal with a reference video signal using a FIFO. FIG. 1 shows two independent video signals with their vertical (field) synchronization pulses FP, and the location of read and write pointers in a First-In-First-Out (FIFO) frame store. When a complete frame store is used, all the artifacts mentioned above can be eliminated. At instants SW (at the end of the subsignal (SS) field synchronization pulses FP), writing the subsignal samples a,b,c,d,e,f,g into the FIFO starts. At instants SR (at the end of the synchronization pulses FP of the reference signal RS), reading of the delayed subsignal samples a,b,c,d,e,f,g from the FIFO starts.

It is also possible to use a single field synchronization memory, i.e., the synchronization memory is reduced to one field per input source. In this case, all the above mentioned artifacts are prevented by performing a so-called field inversion, in case video is in the opposite field-phase of the field-phase being displayed on a monitor. This means that an incoming odd field can be locked to the even field that is currently being displayed (being read-out of the field memory) and the even field is locked to the odd field being displayed. To prevent interlace disorder in this case, a field dependent line-delay is applied. See U.S. Pat. Nos. 4,249,198; 4,797,743; and 4,766,506.

FIG. 2 illustrates locking fields of a video input signal to opposite fields of reference, by selectively delaying one field of input signal by one fine, whereby delay is implemented by delaying the read-out of the FIFO. The locking is shown for the case that the read address of the FIFO is manipulated: the displayed image is shifted down by one line. It is also possible to achieve this by manipulating the write address: a line delay in the write will cause upward shifting of the displayed image by one line. The left-hand part of FIG. 2 shows the reference video signal RS, the right-hand part of FIG. 2 shows the video subsignal SS. In each part, the frame line numbers are shown at the left side. The lines 1,3,5,7,9 are in odd fields, while the lines 2,4,6,8,10 are in the even field. The line-numbers 1O, 1E etc., in the fields are shown at the right side. Arrow A1 illustrates that the even field of the subsignal SS locks to the odd field of the reference signal RS. Arrow A2 illustrates that the odd field of the subsignal SS locks to the even field of the reference signal RS. The arrows A3 illustrate the delay of the complete even field of the subsignal SS by one fine to correct the interlace disorder.

A drawback of field inversion is that an additional field-dependent fine delay is necessary which will shift up or down one line whenever a cross occurs in the next field period. This may become annoying when the number of pixels read and write during a field period are very different. E.g., 20% for PAL-NTSC synchronization will give rise to a line shift every 5 field periods, i.e., 10 times per second for display at the PAL standard, which is a visually disturbing artifact.

To prevent cut-lines, i.e., different parts of the image originating from different field periods causing "cut-lines" to appear in moving images, due to crossing of read and write address pointers of the memory in the visible part of the displayed image, a field-skip should be made. This can be done by predicting whenever a "cross" is about to happen in the next field period. By monitoring the number of lines between read and write addresses after each field period, it is possible to predict the time instant that the number of lines between read and write address pointers becomes zero, i.e., a "cross", one field period before it actually occurs. A good remedy to prevent a cut-line is then to stop the writing of the incoming signal at the start of the new field and resume at the start of a next field period. This way, a cross occurs only within the field blanking period.

Conclusions

In the prior art, synchronization of N video sources with a reference video signal, e.g., the display signal, is possible with N video field memories. However, if pixel/line/field rates differ more than just 1% (shifting once every 2 seconds), which may be the case with low-end VCRs, an annoying up-and down shifting results of displayed images due to the necessary field inversion operation. This can only be prevented by using more than just one field memory, i.e., two field memories (one frame).

It is necessary to use a synchronization memory with two independent ports; one for input of the video signal and one for read-out for display, because the pixel rates of display (read-clock) and video input signals (write clocks) are in general not the same.

Field skips should be applied, e.g., stop writing of video input signal during a complete video field period whenever a "cross" of read/write addresses is expected to occur in this field period. Writing can then be resumed in the next field period. In this way, "cut-line" artifacts are prevented.

SUMMARY OF THE INVENTION

It is, inter alia, an object of the invention to reduce the memory requirements of the synchronization system. To this end, a first aspect of the invention provides a synchronizing system for synchronizing input video signals from a plurality of video sources, comprising means for buffering (B1 . . . BN) each respective one of said input video signals with mutually independent read and write operations, each write operation being locked to the corresponding video input signal, each read operation being locked to a system clock, said buffering means comprising a plurality of buffering units each corresponding to one of said video input signals and being substantially smaller than required to store a video signal field; means for storing (DRAM-1 . . . DRAM-M) a composite signal composed from said input video signals; means for communicating (110) data from said buffering units to said storage means, pixel (X) and line (Y) addresses of said buffering means and of said storing means being coupled.

In accordance with a primary aspect of the invention, it provides a system for synchronizing input video signals from a plurality of video sources. The system comprises a plurality of buffering units each coupled to receive respective one of the input video signals. The buffering units have mutually independent read and write operations. Each buffer write operation is locked to the corresponding video input signal. Each buffer read operation is locked to a system clock. The buffering units are substantially smaller than required to store a video signal field. The system further comprises a storage arrangement for storing a composite signal composed from the input video signals, and a communication network for communicating dam from the buffering units to the storage arrangement, pixel and line addresses of the buffering units and of the storage arrangement being coupled.

These and other aspects of the invention will be apparent from and elucidated with reference to the embodiments described hereinafter.

DESCRIPTION OF THE PREFERRED EMBODIMENTS

Figure 1:
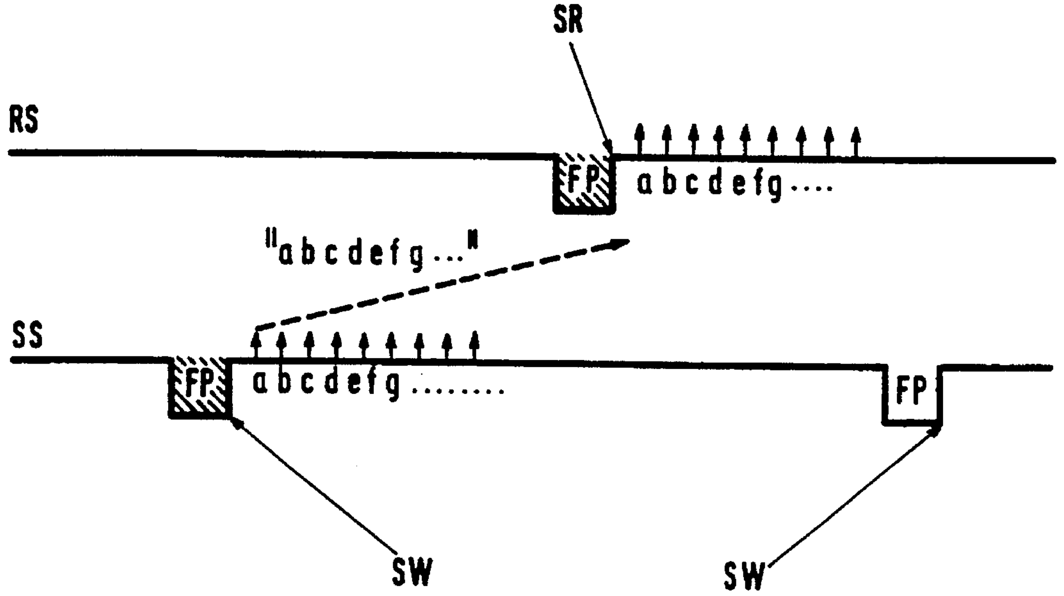
FIG. 1 PRIOR ART
FIG. 1 illustrates synchronization of a video signal with a reference video signal using a FIFO.
Figure 2:
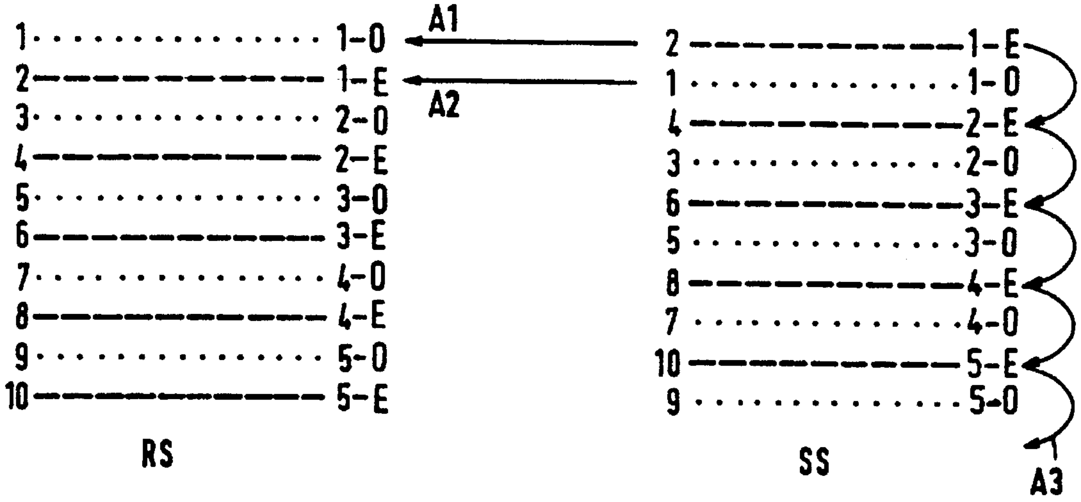
FIG. 2 PRIOR ART
FIG. 2 illustrates locking fields of a video input signal to opposite fields of reference, by selectively delaying one field of input signal by one line, whereby delay is implemented by delaying the read-out of the FIFO.

1. Introduction.

The costs of a multi-window/multi-source system for real-time video signals are highly determined by its memory components, since most functions in such a system can only be realized with memory. Among others, memory components are used to implement the following functions:

synchronization. Different video images are synchronized by aligning their signal components for horizontal and vertical synchronization. To this purpose, a memory of the size of a complete frame/field must be used to delay each additional video signal with an appropriate number of pixels, see U.S. Pat. Nos. 4,249,198; 4,797,743; and 4,766,506. Synchronization is necessary to allow simultaneous processing of different video signals by video algorithms such as fades, wipes and windowing. Only in case no combined processing of video signals is required, and furthermore, in advance is known which signals will be subsampled and which will not, then the size of the field/frame memories can be reduced to match the size of the subsampled signals. Note that in this case, the number and size of windows on the screen are no longer variable.

positioning. After a video signal has been processed, the resulting image must be put at a certain location on the display. To this purpose, a memory is required to shift the image in the horizontal and vertical directions. In the worst case, the size of this memory will be a complete video field. Note that the positioning function can be combined with the synchronization function using the same memory, provided that no video processing on combinations of images is required.

time compression. When video signals are subsampled, the remaining samples will still be on a grid corresponding to a full video display screen. In order to obtain a consistent image without holes, samples must be spaced closer to one another. This can be done with a memory that is written at a low speed (clock speed divided by subsampling factor) and read-out with the system clock. The size of such a memory is equal to the number of bytes in the data samples that remain after down-sampling of a complete video field.

overlay indication. If several windows are displayed on a screen, some will be overlapped by other windows. In this case, there must exist a memory that retains information about the window configuration of the full video display: where do windows overlap each other. The most expensive solution is the use of a complete field memory, where for each pixel, the current overlay situation is encoded, see EP application no. 92.203.879.9 filed on Nov. 12, 1992 corresponding to U.S. patent application Ser. No. 08/165,601, filed Dec. 9, 1993, now U.S. Pat. No. 5,448,307; (Atty. docket PHN 14,328). A more efficient overlay indication scheme is obtained by storing only the horizontal and vertical intersection coordinates between windows.

motion artifact prevention. When video signals are processed and stored in one of the memories listed above, they cannot always be read out from these memories during the same field period and be displayed directly. The reason is that, during the current field, some parts of the video images are updated in the memory for the current field while another part of the video image cannot yet be updated in the memory before the current field has elapsed completely; however, read-out of the memory may occur on both updated and old parts of the memory. This is no problem for still images, but gives serious artifacts in real-time moving video images. The problem is solved by using an additional field memory; namely, one memory is being completely updated during the current field, while the other (already updated) memory is read-out for display of the previous field.

When all video signals (streams of pixels) have been synchronized, processed and positioned at a certain screen position (with the aid of field/frame memories), then they are combined by a so-called fast switch that selects between video signals at pixel basis. See also EP application no. 92.203.879.9 filed on Nov. 12, 1992, corresponding to U.S. Pat. No. 5,448,307 (Atty. docket PHN 14,328), wherein a multi media computer is described that organizes its multi-window video processing memory in a similar way.

An alternative to the fast-switch is the use of a display (field) memory. If such a memory is feasible, it can also realize most of the memory functions listed above. Moreover, the total amount of memory will be reduced: no longer it is necessary to use a complete field-FIFO for each separate video input signal (for positioning, subsampling and cut), but only one random accessible display (field) memory suffices for all.

In the sequel of this application, section 2 discusses the main advantages and drawbacks of the use of a single display (field) memory in a multi-window/multi-source real-time video display system. An architectural concept is reviewed in which the display (field) memory is split into several parts such that it becomes possible to implement most of the memory functions listed above as well as the fast-switch function.

Section 3 describes the architectural concept of section 2 for multi-window real-time video display. It discusses an efficient geometrical segmentation of the display screen and the mapping of these screen segments into RAM modules that allow for minimal memory overhead and maximum performance.

Section 4 gives an architecture for multi-window/multi-source real-time video display systems that uses the RAM segmentation derived in section 3.

In section 5, the application of the display memory as a multi-source video synchronizer is discussed.

2. Using a Single Display Memory in a Multi-Window/Multi-Source Real-Time Display System As opposed to using separate FIFOs and a multiple-input fast-switch (see section 1), a fast Random Access display memory can be used to combine several (processed) video signals into a single output video stream. When video input signals are written concurrently to different sections of the display memory, then a combined multiwindow video signal is obtained by simply reading samples from the memory. By reading out the memory with the system (display) clock, the combined multi-window signal can be displayed on the screen. This approach has the following advantages (compare with the list of functions in section 1):

An additional repositioning/subsampling memory per input-signal becomes obsolete: (processed) video signals are directly written to those x,y addresses in memory such that they are read-out by the standard display pixel-clock at the correct time slots. Note that it is not necessary to maintain a direct relationship between screen-pixels and memory locations. In this case, however, random access is required for read-out, which increases the complexity of the memory-control.

Also a separate memory for time-compression is no longer necessary: by performing burst-write operations on the display memory, video signals are subsampled (note that low-pass pre-filtering must have taken place beforehand).

Next, the display memory can be used as multi-source video synchronizer, provided that no combined processing is required of the different video signals, and that the memory provides sufficient write-access for the different input signals. The necessary time shifting to be done for video synchronization can be obtained by writing to different x,y addresses in the display memory.

In contrast to the memory based functions discussed above, prevention for motion artifacts cannot be realized by a display memory with a capacity of only one video field (note that separate field-FIFOs with a fast-switch suffer from the same problem). Therefore, a display memory should be sufficiently large to hold a complete a video frame.

In accordance with an embodiment of the invention, prior-art access and clock-rate problems (described in sections 2.1 and 2.2 of the priority application, incorporated herein by reference) are solved by splitting the display memory in several separate RAMs of smaller size. If there are N signals to be displayed in N-windows, then we use M ($M \geqq N$) RAMs of size F/M, where F is the size of a complete video frame. This approach solves the access problem if each video signal is written to a different RAM-segment of size F/M. Note that in case faster RAMs can be used, e.g., ones that allow access of f video sources at the same time, then only M/f RAMs of size f*F/M are required to solve the access problem. On the other hand, it is not always possible to solve the access problem if the different RAM segments correspond to specific parts of the screen. For, in that case, two signals might require access to the same segment at the same time. Moreover, if windows have different sizes, both smaller and larger than the RAM-segment size F/M, then overflow will occur in some of the segments at a certain moment in time. These problems can be treated in an implementation of the display memory with several RAM-segments in which each segment corresponds with a different geometrical area on the screen. Here, video signals are written directly to a memory position in a specific segment such that the segment and the address within the segment have a simple one-to-one correspondence with the coordinates on the screen. If M video signals require access to the same segments at the same time, then M-1 additional buffer elements buffer the dam streams of the M-1 video signals to solve the access conflict (assuming that the number of video sources that can access the buffer concurrently equals one). If, during a certain time interval, no video source requires any access to a memory segment, then the data from one of the buffers can be transferred to this segment.

The size of each buffer in this approach heavily depends on how the screen is subdivided into different geometrical areas, where each screen segment is mapped onto one of the RAM segments. This is the subject of the next section.

3. Segmentation of the Display Memory

In this section we will discuss a subdivision of the geometrical screen area (in M parts), such that an optimal display architecture (in terms of memory, switches and control) is obtained. Each one of these screen parts is associated with a different RAM segment (M in total) with capacity F/M, where F is the size of a video frame (or video field if no motion artifacts need to be corrected). Addresses within each segment correspond to the x,y coordinates within the associated screen part, which has the advantage that no additional storage capacity for the addresses of pixels needs to be reserved. This property becomes even more important in HD (high definition) display systems that will appear on the market during the current and next decade and which have four times as many pixels as in SD (standard definition) displays. The drawback of this approach is that additional memory is required to buffer those video data streams that require access to the same RAM segments at the same time. The size of the buffers depends on the maximum length of the time intervals during which concurrent access takes place as well as the time intervals that a segment is not accessed at all. Namely, these latter "free" time intervals must be sufficiently large to flush the contents of the buffer before the next write cycle occurs to this buffer.

In order to be able to write a multiple of video signals to the same segment, they must be interleaved in time. If there are N signals that require access to the same segment, then one of them can be written directly to the appropriate segment while the N-1 other signals must be buffered. The size of these buffers depends on the extend to which interleaving is possible. In the sequel, (partial) video signal interleaving will be considered. This level of interleaving requires buffers that can store (parts of) one video line. Depending on the number of subsampled video signals and the respective subsampling factors, straight forward line interleaving can be possible in some cases. In general, video signals can not be interleaved directly at line basis. The main advantage of this approach is that it allows segments to be accessed at line basis. This enables the application of cheap DRAMs with a write-page-mode, since page-mode addressing allows fast addressing of pixels within a single row (video line) of such a RAM.

The chosen level of interleaving of video signals will heavily depend on the chosen configuration of screen segments. As has been set out in section 3.2 of the priority application, non-horizontal segmentation strategies only lead to suboptimal solutions: more buffer memory is required than in the case of horizontal segmentation. Therefore, in the sequel, only a display memory segmentation based on sub-line interleaving (horizontal segmentation) will be considered.

In U.S. Pat. Nos. 4,947,257 and 5,068,650, a horizontal segmentation strategy is described for a multi-window/multi-source real-time video (HDTV) display system. Here, a fine-groin (pixel-level) interleaving strategy is applied and a different mapping between screen coordinates and memory segments is proposed as compared with the horizontal segmentation strategy described above. More precisely, in U.S. Pat. No. 5,068,650, each memory segment S_i stores columns i, i+16, i+32, . . . , i+j*16 of the display area, with i=0, 1, . . . , 15, and j=0, 1, . . . , 120 for HDTV resolution. Unfortunately, this system cannot exploit the "paging"-mode of the display-segment RAMs, since interleaving occurs at the pixel level. This means that much of the total access bandwidth of the 16 memory segments is spend for row-addressing only. Another drawback of this system is that a complicated controller and "rotating" shuffle-network are required to route each pixel in a stream of video data to a different memory segment.

4. Architecture of the Multi-Window/Multi-Source Display System

The basic architecture of a horizontally segmented display memory with buffers solving all access conflicts comprises look-up tables (so-called event lists) to store the coordinates of window outlines as well at the locations where different windows intersect: these tables are called "event lists". When at a certain time instant during a video field—referenced by global line and pixel counters—an event occurs, then the event counter(s) increment and new control signals for the input buffers and switch matrix, and new addresses for the RAM segments are read from the event lists.

In an alternative implementation, the event lists are substituted by a so-called Z-buffer, see U.S. Pat. No. 5,068,650. In graphics applications, a Z-buffer is a memory that stores a number of "window-access permission" flags for each pixel on the screen. Access-permission flags indicate which input signal must be written at a certain pixel location in one of the display segments, hence determine the source signal of a pixel (buffer identification and switch-control). Here, graphics data of only one window can be written to a certain pixel while access is refused to other windows. This way, arbitrary window borders and overlapping window patterns can be implemented.

In a more efficient embodiment, Z-buffers with "run-length" encoding are used. Run-length encoding means that for each sequence of pixels, the horizontal start position of the sequence and the number of pixels therein is stored for each line. Consequently, a reduced Z-buffer can be used. However, note that such a Z-buffer is equivalent to an event list that stores the horizontal events of each line. Furthermore, note that a true event list, based on rectangular windows, can be considered as a two-dimensional Z-buffer with two-dimensional run-length encoding. Evidently, the use of true event lists (for rectangular windows) is the most efficient solution to the control problem, but, on the other hand, a Z-buffer implementation (with or without run-length encoding) offers the realization of arbitrary window shapes, since Z-buffers define window borders by means of a (run-length encoded) bit-map. In case of true event-based window-shape construction, then windows borders must be interpolated by the event-generation logic, which requires extensive real-time computations for exotic window-shapes.

In an embodiment of the invention, for each video signal, a separate input buffer is used. The number of intersections between windows and the part of the video signal that is displayed in the window determine the number of events per field and so the length of the event lists. Note that if such a list is maintained for every pixel on the screen, a complete video field memory is required to store all events. Events are sorted in the same order as which video images are scanned, such that a simple event counter can be used to step from one control mode to the next. Unlike display systems in which the overlay hierarchy of windows is maintained for every pixel on the screen (see e.g., U.S. Pat. No. 5,068,650), the overlay hierarchy is added as control information to the different events in the event list. This is possible since events can be generated in such a way that between two subsequent events, only some part of a single window is visible: i.e., the parts of the window that has the highest overlay priority at the current screen position. The event lists contain information to control the buffers and the RAM segments in the architecture. To this purpose, an event-entry in the list must contain a set of N enable signals for the input buffers, and a set of M enable signals for the display segments. Moreover, it must contain display segment addresses as well as a row-address for each display segment. Advantageously, event lists are local to display segments and buffers. Then, only the events that are relevant to a specific display segment and/or a buffer will be in its local event-list. As a result, the number of events per list as well as the number of bits/event will be reduced. Now, for each display segment, a local event list will contain:

one fine/pixel coordinate, one row address (or none if row address is computed in real time), the address of the columns inside the current row where writing starts and stops (stop offset is not strictly necessary), two enable signals (read/write/inhibit for display segment, and read/inhibit for buffer from which the display segment will get its data). For each buffer, a local event-list only contains write or inhibit events:

one line/pixel coordinate stored per event, an enable signal (write/inhibit) for the buffer. No (row) addresses are needed since all buffers operate as FIFOs.

Figure 3:
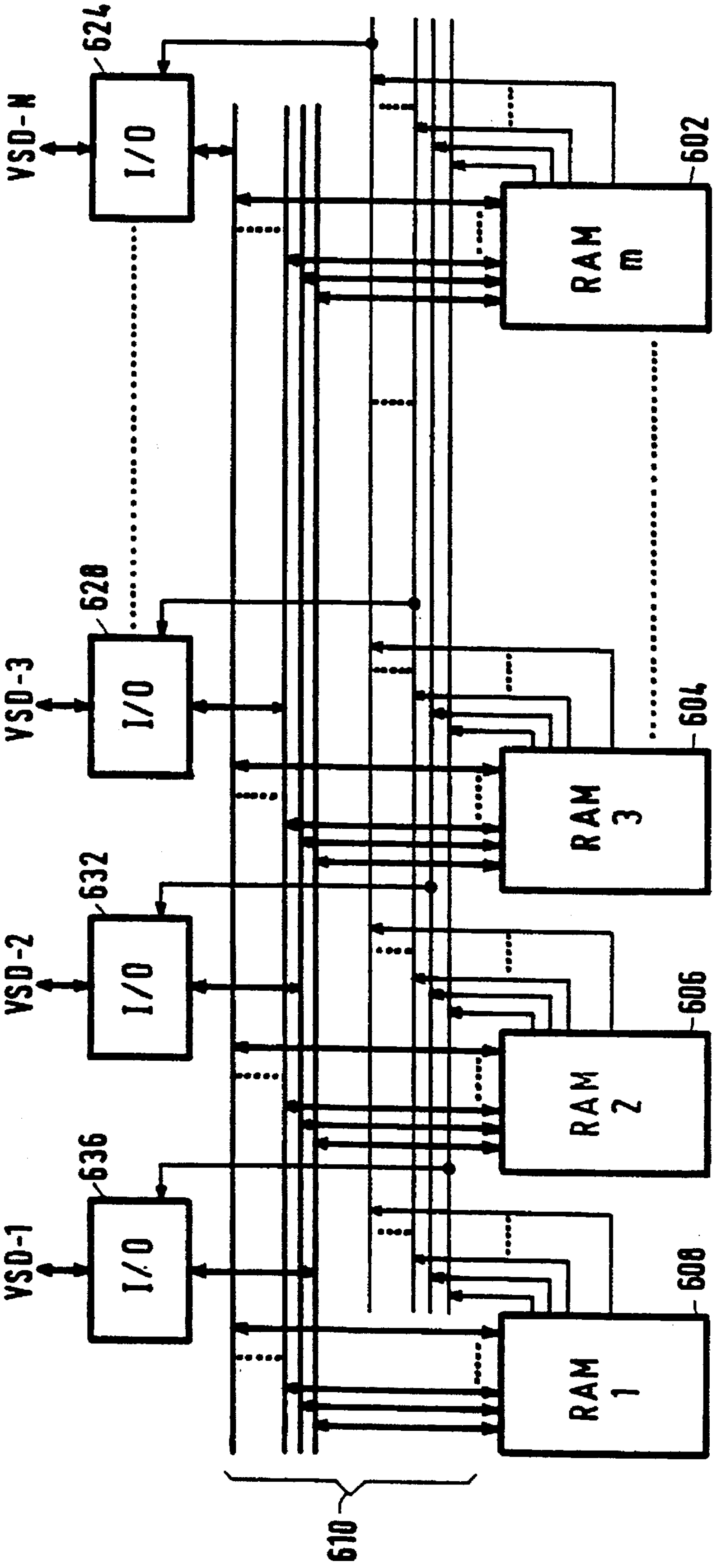
FIG. 3 shows the overall architecture of the multi-window/multi-source real-time video display system of the invention.
Figure 4:
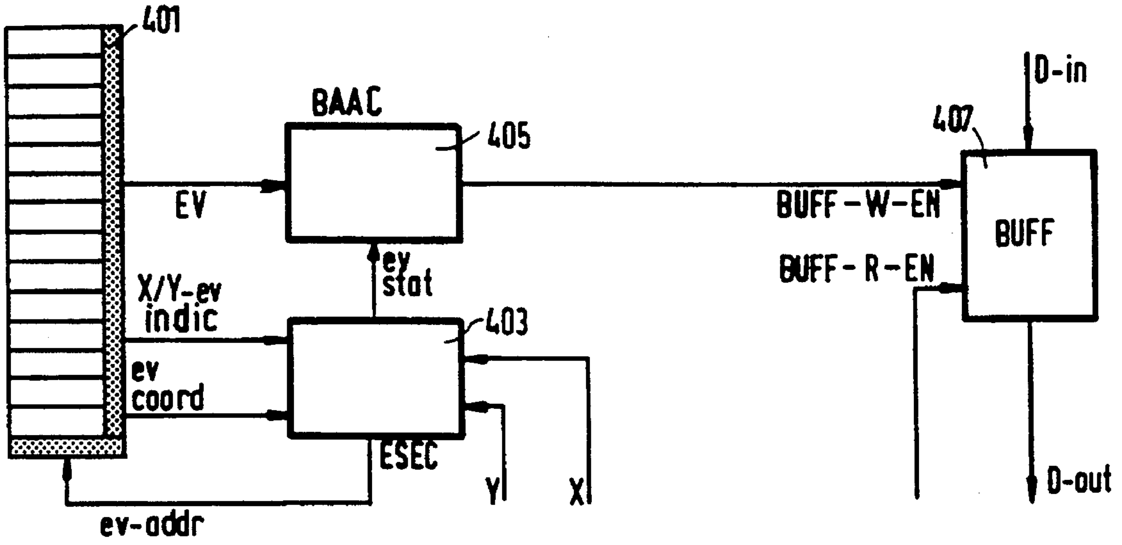
FIG. 4 shows the architecture of an input-buffer module and its local event-list memory/address calculation units.
Figure 5:
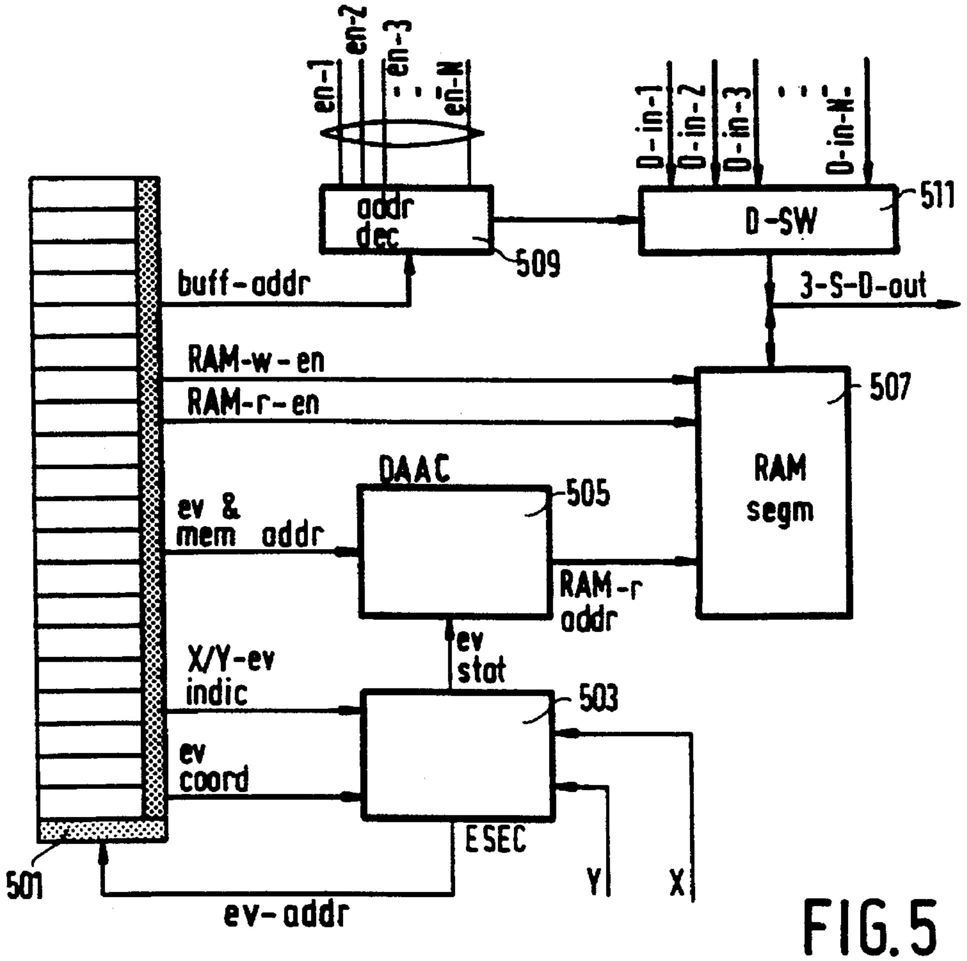
FIG. 5 shows the improved architecture of a display-segment module and its local event-list memory/address calculation units.

FIGS. 3–5 illustrate an embodiment of the invention in which the above considerations have been taken into account. FIG. 3 shows the overall architecture of the multi-window/multi-source real-time video display system of the invention. FIG. 4 shows the architecture of an input-buffer module and its local event-fist memory/address calculation units, which implements the improvements to the display-architecture as described above. FIG. 5 shows the improved architecture of a display-segment module and its local event-list memory/address calculation units.

FIG. 3 shows the overall architecture of the multi-window/multi-source real-time video display system. The architecture comprises a plurality of RAMs 602–608 respectively corresponding to adjacent display segments. Each RAM has its own local event list and logic. Each RAM is connected (thin lines) to a bus comprising buffer-read-enable signals, each line of the bus being connected to a respective I/O buffer 624–636. Each I/O buffer 624–636 has its own local event list and logic. Each I/O buffer 624–636 is connected to a respective video source or destination VSD. Data transfer between the I/O buffers 624–636 and the RAMs 602–608 takes place through a buffer I/O signal bus (fat lines). The buffer I/O signal bus (fat lines) and the buffer-read-enable signal bus (thin lines) together constitute a communication network 610. More details, not essential to the present invention, can be found in the priority application, incorporated herein by reference, with reference to its FIG. 7.

FIG. 4 shows the architecture of an input-buffer module and its local event-list memory/address calculation units, which implements the improvements to the display-architecture as described above. A local event list 401 receives, from an event-status evaluation and next-event computation (ESEC) unit 403, an event address (ev-addr) and furnishes, to the ESEC unit 403, an X/Y event indicator (X/Y-ev-indic) and an event-coordinate (ev-coord). A global line count Y and a global pixel count X are applied to the ESEC unit 403. The ESEC unit 403 also furnishes an event status (ev-stat) to a buffer access control and address computation (BAAC) unit 405, which receives an event type (ev) from the local event list 401. The BAAC unit 405 furnishes a buffer write enable signal (buff-w-en) signal to a buffer 407. From a read enable input, the buffer receives a buffer read enable signal (buff-r-en). The buffer 407 receives a data input (D-in) and furnishes a data output (D-out).

FIG. 5 shows the improved architecture of a display-segment module and its local event-list memory/address calculation units. A local event list 501 receives, from an event-status evaluation and next-errol computation (ESEC) unit 503, an event address (evaddr) and furnishes, to the ESEC unit 503, an X/Y event indicator (X/Y-ev-indic) and an event-coordinate (ev-coord). A global line count Y and a global pixel count X are applied to the ESEC unit 503. The ESEC unit 503 also furnishes an event status (ev-stat) to a segment access control and address computation (DAAC) unit 505, which receives an event type and memory address (ev & mem-addr) from the local event list 501. The DAAC unit 505 furnishes a RAM row address (RAM-r-addr) to a RAM segment 507. The local event list 501 furnishes a RAM write enable (RAM-w-en) and a RAM read enable (RAM-r-en) to the RAM segment 507, and a buffer address (buff-addr) to an address decoder addr-dec 509 with tri-state outputs (3-S-out) en-1, en-2, en-3, . . . , en-N connected to read enable inputs of the N buffers. The address decoder 509 is connected to a data switch (D-sw) 511 which has N data inputs D-in-1, D-in-2, D-in-3, . . . , D-in-N connected to the data outputs of the N buffers. The data switch 511 has a data output connected to a data I/O port of the RAM segment 507 which is also connected to a tri-state data output (3-S D-out).

As is shown in FIG. 3, it is quite easy to extend the architecture to a multi-window real-time video display system with bi-directional access ports, bi-directional switches and bi-directional buffers. This way, the user can decide how many of the I/O ports of the display system must be used for input and how many for output. An example is the use of the display memory architecture of FIG. 3 for the purpose of 100 Hz upconversion with median filtering according to G. de Haan, Motion Estimation and Compensation, An integrated approach to consumer display field rate conversion, 1992, pp. 51–53. In this case two outputs at 32 Mpixels/sec (100 Hz) are necessary to perform the required Median operation, while other ports can be used as inputs for (50 Hz) video signals at 16 Msamples/sec (2 input video signals per input port can be multiplexed).

The address calculation units associated with the event lists as indicated in FIGS. 4, 5 can be split into two functional parts.

Event-Status Evaluation and Next Event Computation (ESEC)

Display-segment Memory Access operation Control and Address Calculation (DAAC) for display segments, and Buffer Memory Access operation Control and Address Calculation (BAAC) for input buffers. These parts are discussed in the sequel.

Event-Status Evaluation and Next Event Computation (ESEC)

The inputs to this block are the global line/pixel counters, the X or Y coordinate of the current event and a one-bit signal indicating if the current coordinate is of type X or Y. The occurrence of a new event is detected if the Y-coordinate of the event equals the value of the line-counter and the X-coordinate equals the pixel-count. It is clear that the "Event-Status-Evaluation and Next-Event-Computation" block (ESEC) cannot compare the X/Y coordinates of all events in the event list with the current line/pixel count, since this would require many operations to be executed within a single clock cycle. Instead, the event list is sorted on Y and X-values and the ESEC stores an address for the event list that points to the current active event. The event-list address-pointer is then incremented to the next event in the list as soon as the X/Y coordinates of the next event match the current line/pixel count.

Due to the order in which all types of video images are scanned, (from the left to the right, line per line starting at the top of the image, see CCIR Recommendation 470–1), the increment rate of a line-counter is much lower than the increment-rate of a pixel-counter. Therefore, it is sufficient to compare the Y-value of the next-event in the list only once every line, while the X-coordinate of the next event must be compared for every pixel. For this reason, the events in the event lists contain a single coordinate which can be a Y or a X coordinate as well as a flag indicating the type of the event (X or Y).

To assure that event lists, that contain either Y or X-events, are properly interpreted by the ESEC, it is necessary that a complete group of events is valid within a specific Y-interval. Such a group of events is then of type X and will be delimited by two Y-events that indicate the Y interval in which the X-events are valid. This way, when the coordinate C_1 of an event is of type Y, then all events between this current Y-event and the next Y-event with coordinate C_2 in the event list are X-events that can only occur between lines C_1 and C_2.

When all X-events in a group have become valid (end of line is reached) then the next Y-event is encountered. At this point, the ESEC must decide whether the next Y-event is valid or not. If it is valid, then the address-pointer is incremented. However, if the next Y-event is not valid for the current line-count, then it means that the previous Y-event remains valid and the ESEC resets the address-pointer to the first X-event following the previous Y-event in the event list.

The ESEC signals to the memory-access control and address calculation unit the status of the current event. This can be "SAME-EVENT", "NEXT-X-EVENT", "NEXT-Y-EVENT" or "SAME-Y-EVENT-NEXT-X-EVENT-CYCLE" (i.e. next line within the same Y interval). This latter unit uses the event-status to compute a new memory address for the display segment and/or input buffer. This is described below.

Buffer Memory Access Control and Address Calculation

In case the type of the current event—as signalled by the ESEC—is "WRITE", the buffer memory-access control and address calculation unit (BAAC) increments the write pointer address of the input buffer (only if the buffer does not do this itself) and activates the "WRITE-ENABLE" input port of the buffer. The BAAC also takes care of horizontal subsampling (if required) according to the Bresham algorithm, see EP-A-0384,419, corresponding to U.S. Pat. No. 5,283,561. To this purpose, it updates a so-called fractional increment counter. Whenever an overflow occurs from the fractional part of the counter to the integer part of the counter, a pixel is sampled by incrementing the buffer's write-address and activating the buffer's "WRITE-ENABLE" strobe.

Display-Segment Memory Access Control and Address Calculation

The display-segment memory-access control and address-calculation unit (DAAC) of a specific display segment controls the actual transfer of video data from an input buffer to the display segment DRAM. To this purpose it computes the current row address of the memory segment using the row address as specified by the current event and the number of iteration cycles (status is "SAME-Y-EVENT-NEXT-X-EVENT-CYCLE") that have occurred within the current Y-interval (see above). The DAAC does the row-address computation according to the Bresham algorithm of U.S. Pat. No. 5,283,561, so that vertical subsampling is achieved if specified by the user. Furthermore, the DAAC increments the column address of the display segment in case the same event-status is evaluated as was the case with the previous event-status evaluation. Another important function that is carried out in real-time by the DAAC is the so-called flexible row-line partitioning of memory segments. Namely, it is not necessary that rows in the DRAM segments uniquely correspond to parts of a line on the display. If—after storing a complete line part L/M—there is still room left in a row of a DRAM segment to store some pixels from the next line, the DAAC can control this. This is done as follows. If the DAAC detects the end of a currently accessed row of the current display segment RAM, it disables the buffer's read output, issues a RAS for the next row of the RAM, and resumes writing of the RAM. Note that also the algorithms for event generation must modify the address generation for RAM-display segments in case flexible row/line partitioning is required.

Finally, the unique identification of the source-buffer—as specified by the current event—is used to compute the switch-settings. Then, the read or write enable strobe of the display segment RAM is activated and a read or write operation is executed by the display segment.

The functionality of the ESEC and the B/DAAC can be implemented by simple logic circuits like counters, comparators and adders/subtracters. No multipliers or dividers are needed.

Section 5 of the priority application, incorporated herein by reference, contains a detailed computation of the number and the size of the input buffers for horizontal segmentation which is unessential for explaining the operation of the present invention.

In this application, a memory architecture is described that allows the concurrent display of real-time video signals, including HDTV signals, in multiple windows of arbitrary sizes and at arbitrary positions on the screen. Moreover, the architecture allows generation of 100 Hz output signals, progressive scan signals and HDTV signals by using several output channels to increase the total output bandwidth of the memory architecture. Naturally one can make a trade-off between required input bandwidth and output bandwidth within the total access bandwidth offered by the display memory architecture. This way one can make a HDTV multi-window I/O system with medium speed DRAMs.

Theoretically, it is also possible to multiply the maximum number of displayed windows by $r^2$, if video input data streams are subsampled with a factor r. However, note that we cannot interleave video streams at pixel basis, since in this case, a prohibitive number of RAS cycles should be inserted every line. Therefore, only interleaving at line basis should be allowed, such that the maximum number of displayed windows can be multiplied with r, instead of $r^2$.

The display memory in this architecture is smaller or equal to one video frame (so-called reduced video frame) and is built from a few number of page-mode DRAMs. If the maximum access on the used DRAMs is f times the video data rate (in pixels/sec), then for N-windows, N/f DRAMs are required with a capacity of f*F/N pixels, where F indicates the number of pixels of a reduced video-frame. Several types of DRAMs are on the market that have access rates f=1 to f=10 in column address-mode or page-mode (see section 2). As can be expected, the price of these RAMS increases with f. Furthermore, it is possible to partition the rows and columns of the DRAMs in such a way that an optimal match between the number of lines and columns per segment is obtained. Also the pixels in each row of the DRAMs that are in excess of the required number of pixels/line in a segment can be used. This asks for flexible partitioning (see section 4). E.g., a DRAM with 512 rows and 512 columns, can be partitioned for a display segment that must have 1024 lines and 128 pixels per line per field.

Then a total of 12 (12 * 128=1536 pixels per line) of these DRAMs allow the implementation of a (reduced) video frame memory for a 12-window HDTV real-time video display system.

Besides the display memory, the architecture uses N input buffers (one buffer per input signal with write-access rate equal to pixel rate) with a capacity of approximately 3/2 video line per buffer (see section 5 of the priority application). As an example, for N=6, and Standard Definition video signals (720 pixels per line, 8 bits/pixel for luminance and 8 bits/pixel for color), 720 * 16=11520 bits per video line are required which leads to a total buffer capacity of 6 * 3/2 * 11520=100 Kbits.

For each display segment (N in total), a look-up table with control events (row/column addresses, read-inhibit-, write-inhibit-strobes for display segment and read-inhibit-strobe for input buffer, X- or Y coordinate) is used which has a maximum capacity of $4.N^2+5.N-5$ events. For each input buffer, a look-up table with control events (write-inhibit-strobe, X- or Y coordinate) is used which has a maximum capacity of 6.N–2 events. The address calculation for the look-up table is implemented by an event counter, a comparator and some glue logic. A numerical example (6 window system) that computes the maximum number of bits to be stored in the look-up tables—if real time processing must be minimized—is given below. For Standard Definition TV signals, row addresses require 9 bits, column addresses (within a segment) require 7 bits (for $N\geqq6$), an X- or Y-coordinate requires 10 bits and the enable strobes require 1 bit/strobe. Then, $4.N^2+5.N-2$ events of (9+2*7+10+3=) 36 bits are required for the display segments and 6.N–2 events of (10+1=) 11 bits for input buffers. For N=7, (6 windows+ one read-out access), a total maximum of 7*(226*36+ 40*11)=7 * 8576=60032 bits are required for the look-up tables. If these events are computed on a CPU that transfers them to the display-memory architecture by a relatively slow data communication protocol like IIC (100 Kbit/sec), then it takes 60032/100000=0.6 seconds to complete the transfer. This is an acceptable worst case maximum wait-time for the user when he make a change in the window configuration. In most cases the number of bits and transfer time will be an order of magnitude smaller. For a large number of windows, like N=9, still a sufficiently small maximum transfer-time (less than 1.2 seconds) is possible.

Note that in case it is undesirable to blank the complete green during transfer (and load) of event data, intermediate storage must be available in the display system. This can be implemented as a set of shadow event-lists—that replace the current event lists instantaneously as soon as an enable signal for the look-up tables is toggled—or as a slow-in, fast-out FIFO buffer, that updates the event lists within the vertical-blanking time.

Yet another possibility is to "freeze" the video images on the screen by disabling write of the display segments while keeping the read enabled. However, in order to let this work, separate (fixed) event lists must be used for the read-out of the display segments which evidently need not be updated for changes in the current window configuration (always the full screen is read out). In this case, the event-generation program must reserve time slots that correspond to the "fixed time slots" in the separate read-out event-lists.

A switch matrix with N inputs and n outputs is used to switch the outputs of the N buffers to the N DRAMs of the display memory. Straightforward implementation requires $N^2$ video data switches (16 bits/pixel).

5. Use of the Display System for Multi Source Video Synchronization

One can identify three levels at which video signals must be synchronized before they can be displayed together on the same screen.

1. subpixel level. There are two possibilities: (1) video signals are sampled with a line-locked clock, or (2) video signals are sampled with a constant clock. In case (1), the sample clocks of the different video signals are unrelated, but the distance between the horizontal sync pulse (start of a line) and the sample moments are the same (ignoring jitter) for all video signals. Synchronization of video signals at the subpixel level is now concerned with conversion of the sample dam rate (pixel rate) of incoming video signals to another sample rate (pixel rate): the rate at which pixels are displayed on the screen. This can be done with a small FIFO memory or a subpixel interpolator. In case (2), all sample clocks are the same, but the distance between sample moments and start of a video line differs per video signal and varies with time. Now, first this distance must be made the same (within a predefined accuracy) for all video signals. To this purpose, new sample values must be computed (interpolated)—that have the required distance to the start of the line—using the given horizontal sync- and sample positions and sample values. This can only be done by a subpixel interpolator, since no memory device can change sample data values.
2. pixel level. Even when the sample rates of all video signals are converted to one common sample rate, the video samples cannot yet be displayed together on the same screen. Namely, in general, the start of a new line in a specific video signal does not occur at the same time as the start of a line in another video signal. Therefore, a shift at the pixel level is necessary to align the horizontal synchronization pulses. The only way to implement such a shift is using a memory device such as a FIFO.
3. line level. Finally, it is necessary to align the starting points of the video fields of all video signals. I.e., align the vertical synchronization pulses of all video signals. Also this time shift can only be implemented with a memory device like a FIFO or with a row addressable display memory.

All three levels of synchronization can be implemented with the display architecture of FIG. 3, in case the incoming video data is sampled with a line-locked clock. This is described in the following subsections. In case a constant sample clock is used, still synchronization at the pixel- and line-level is possible, but for subpixel alignment also some interpolation technique must applied.

Basically, there are two methods of buffering incoming video data

1. The buffers are arranged for taking care of all variations in read-write frequencies of the buffers, while read-write address distances in the display memory remain the same until a field or frame skip takes place, i.e., the display memory read-write address pointer distance is changed during the field blanking. Thus discrete changes of the read-write addresses of the display memory, which requires somewhat larger input buffers of line skips.
2. The buffers only care for variations in the line period and are transparent otherwise, which implies that the display memory read-write address pointer distance is changed continuously. This requires somewhat more control effort, but the buffers may be smaller than with the first method.

5.1 Subpixel synchronization

Subpixel synchronization can be done with the input buffers of the architecture of FIG. 3 if video data is sampled with a line-locked clock. These buffers can be written at clock rates different from the system clock, while read-out of the buffers occurs at the system clock. Because of this sample rate conversion, the capacity of input buffers must be increased. This increase depends on the maximum sample rate conversion factor that may be required in practical situations.

Let f_source denote the sample rate of an input video source that must be converted to the sample rate of the display system f_sys, then with $$r\_max=\max\{f\_source/f\_sys,\ f\_sys/f\_source\},$$

r_max times more samples are read from the buffer than are written to it or, r_max times more samples are written to the buffer than are read from it. Evidently, this cannot go on forever since then the buffer would either underflow or overflow. Therefore, a minimum time period must be identified after which writing or reading can be stopped (not both) such that the buffer can flush data to prevent overflow or that the buffer can fill up to prevent underflow. With regard to the first buffering method, it is noted that when writing is stopped, samples are lost, while stopping of reading causes that blank pixels are inserted in the video stream. In both cases, visual artifacts are introduced. Therefore, the time period after which the buffer is flushed or filled must be as large as possible to reduce the number of visual artifacts to a minimum. On the other hand, if a large time period is used before flushing or filling takes place, then many samples must be stored in the buffer, which increases the worst case buffer capacity considerably.

Another problem that occurs when pixels are dropped or inserted is that the synchronization between incoming video signals and display clock is lost. Resynchronization at the pixel- and line level is therefore mandatory. Each video signal contains synchronization reference points at the start of each line (H-sync) and field (V-sync), hence, the most convenient moment in time to perform such an operation is at the start of a new line or field in the video input stream. This is described in sections 5.2 (pixel level synchronization) and 5.3 (line level synchronization). As a consequence, the time period, where writing and reading should not be interrupted, must be equal to the complete visible pan of a video line- or video field period. In the next two subsections, the worst case increase of buffer capacity is computed for buffer filling and flushing at field- and line rate.

Filling and Flushing during the Field Blanking Period

If in the first buffering method, the time period, where writing/reading of the buffers is not interrupted, is taken to be equal to a complete video field, then the complete vertical blanking time is available for filling and flushing of the input buffers. Filling and flushing is (1) to interrupt reading from a buffer when a buffer underflow occurs, (2) to interrupt writing into the buffer when a buffer overflow occurs, or (3) to increase the read frequency when a buffer overflow occurs. In the case that the vertical blanking period is sufficiently large such that filling and flushing can be completed, then no loss of visible pixels occurs within a single field period. Remark that for vertical (line-level) synchronization of video signals, a periodic drop of a complete field cannot be avoided if input buffers are of finite size (see section 5.3.). More precisely, if the number of pixels in the visible pan of a field is given by F and the number of pixels in the invisible part of the field (field blanking only) is given by F_blank, then—to prevent loss of visible pixels during a complete field period—it must hold that:

$$r\_max*F-F\leq F\_blank,$$

or, $$r\_max\leq 1+F\_blank/F.$$

Consider a standard definition video signal according to CCIR Recommendation 601, then there are 288 visible lines per field (720 visible pixels per line) and 24 invisible lines per field, hence the maximum sample ram conversion factor r_max is given by r_max=1+24/288=1.08 without losing visible pixels within the same field. This means that a 8% variation of the sample rate of video input signals—compared with the standard pixel clock rate—is permissible without introducing visible artifacts (except for periodic field skips: see section 5.3). This is largely sufficient for the video signals from most consumer video sources such as TV, VCR and VLP.

To prevent overflow of input buffers, the worst case increase of buffer capacity ΔC_buf (for full screen window size) can be expressed as:

$$\Delta C\_buf=(r\_max-1)*F.$$

The same holds for underflow of input buffers, hence the total capacity of each input buffer must be increased with 2*ΔC_buf to prevent both underflow and overflow. As an example, again consider standard definition video signals according to CCIR recommendation 601 (720 visible pixels per line and 288 visible lines per field), hence F=720 * 288=207360 pixels and with r_max=1%, follows ΔC_buf=2074 pixels (approximately 3 video lines). In practice however, the line frequency of most consumer video sources is within a 99.1% average accuracy of the 15,625 kHz line frequency of standard definition video. In this case ΔC_buf=207 pixels (¼th video line) suffices.

Resynchronization of the V-sync (start of field) of the incoming video signal with the display V-sync is done at the end of the vertical blanking period (start of new field) of the incoming video signal. This is described in section 5.3.

Filling and Flushing during the Line Blanking Period

A good alternative that does not cause any visual artifacts and that does not increase the required buffer capacity, is to store samples (pixels) during the complete visual part of a video line period (of the incoming video signal) and do the flushing and filling of buffers during the line blanking period. Unfortunately, for N=6 video sources and M=6 memory segments, the display architecture of FIG. 3 already uses the line-blanking period to increase the total access to the display memory. By exchanging one video access against an additional time slot (1/M-th line period) per video line and per video source, a significant increase of filling or flushing time of input buffers is achieved without increasing the total buffer capacity. If more display segments are used (M>6), then the fill/flush interval L/M becomes shorter. For large M (M>10) more, than one time period L/M fits into the line blanking period, hence, one can trade-in synchronization power for more access, or spend an additional L/M time period for filling/flushing (increasing the synchronization range). For small M (M<6), i.e., when only a few windows are displayed or when fast display-segment RAMs are used, no time period L/M fits in the part of the blanking time not already used for refresh, hence, it is not possible to use this time period to increase the access to the display memory. This means that always some part of the line blanking period can be used for filling/flushing. On the other hand, it is not possible to write a complete row of the display segments during the line blanking time. As a consequence more than one row addressing cycles (RAS) must be spent for each row of the display segments—leading to an increase of buffer capacity—and the complexity of the event logic and event-generation software is increased.

As an example, consider a standard definition video signal according to CCIR Recommendation 601, then there are 720 visible pixels (L=720) and 144 invisible pixels per line (L_blank=144), hence the maximum sample rate conversion factor r_max is given by:

$$r\_max=1+L\_blank/L=1+144/720=1.2.$$

As it was said before, some part of the line-blanking period must be used to refresh the RAM segments, hence only L/M cycles remain for filling or flushing (for N=M=6). In this case, r_max=1+(720/6)/720=1.16. This means that a 16% variation of the sample rate of video input signals—compared with the standard pixel clock rate—is permissible without introducing visible artifacts. This is largely sufficient for the video signals from most consumer video sources such as TV, VCR and VLP.

5.2 Pixel Level Synchronization

Horizontal alignment can also be obtained with the input buffers of the display architecture. The actual horizontal synchronization is obtained automatically if a few video lines before the start of each field, read and write addresses of input buffers are set to zero. For, during a complete video field, no samples are lost due to underflow or overflow, while the number of pixels per line is the same for all video input signals (for line-locked sampling) and the display, hence, no horizontal or vertical shift can ever occur during a field period. As a consequence, no additional hardware and software is required as compared to the hardware/software requirements described in the previous subsection to implement horizontal pixel-level synchronization.

In case video signals are sampled with a constant clock, the number of pixels per line may vary with each line period, which asks for a resynchronization at line basis. This is also the case when line-locked sampling is applied and input buffers are flushed or filled in the line blanking period of the video input signals to prevent underflow or overflow of input buffers during the visible part of each line period. Resynchronization can be obtained resetting the read address of the input buffer to the start of the line that is currently being written to the input buffers. In case the capacity of input buffers is just sufficient to prevent under/overflow during a single line period, a periodic line skip cannot be avoided.

The main drawbacks of the approach is that the I/O access to the display memory is decreased (one horizontal time slot must be reserved for filling/flushing) and that frequent line skips will lead to a less stable image reproduction.

5.3 Line Level Synchronization

At the end of a field of the incoming video signal (in the field blanking period), input buffers are filled/flushed (for field level filling and flushing only) and vertical resynchronization must be done to account for the loss of pixels (due to flushing) or the insertion of new pixels (due to filling). This vertical alignment of video images is obtained by adapting the address generation for the DRAM segments to the current required vertical offset.

One possible implementation is to generate new event lists for every field of the incoming video signals. This approach requires that the event-calculation algorithm can be executed on a micro processor within a single field period. Another possibility is to compute a source-dependent row offset (for vertical alignment) at a field by field basis, which can be performed by the address-calculation and control logic of the display segments. Instead of a field-by-field basis, a line by line basis or a pixel by pixel basis (in general: on an access basis) are also possible.

The distance between read and write addresses of input buffers must be within a specified range to prevent that underflow or overflow occurs during a single field period. In practice, at the start of a new field in one of the incoming video signals, the distance between read and write addresses may occur not be within the specified range. In this case it is possible to insert or remove a line delay between the read- and write addresses of the input buffers by disabling their write- or read strobe during the first line of a new field in one of the video input streams. Because of such an action, the video image would be shifted vertically over one line, leading to instability of the displayed image. This problem is solved by applying an additional row offset such that no vertical shift is noticed on the screen. All this can be performed with a simple logic circuits as edge detectors, counters, adders/subtracters and comparators. These circuits will be part of the address calculation and control logic of each display-segment module.

Note that the synchronization mechanism sketched above is robust enough to synchronize video signals that have a different number of lines per field than is displayed on the screen. Even in case the number of lines per field varies with time, synchronization is possible since the address for the display RAMs is computed and set for each field or each access. If the difference of lines per field is larger than the vertical blanking time, visual artifacts will be visible on the screen (e.g., blank lines).

As an example, consider the synchronization of 50 Hz video signals (312.5 lines per field) with 60 Hz video signals (262.5 lines per field), then at the end of every 60 Hz field, updating of the row offset occurs (increment/decrement of row offset with 312.5–262.5=50 lines per field) such that vertical synchronization pulses of both signals are aligned at field rate. Then, once every 312.5/50=6.25 field periods, a field skip must be applied, leading to swap of odd and even field periods. The visual artifact introduced by this swap can be compensated for using an additional line delay or an extra field memory, dependent on the required image quality (see U.S. Pat. No. 4,249,198, 4,766,506 and 4,797,743). In case a field skip occurs rather frequently (several times per minute), as is the case with 50 Hz/60 Hz synchronization, insertion of an additional line delay on a field by field basis becomes visibly annoying, hence an additional field memory must be applied.

5.4 Further details

In this section 5 it has been described that the display-memory architecture of FIG. 3 can be used to synchronize a large number of different video sources (for display on a single screen) without requiring an increase of display-memory capacity. It is capable to synchronize video signals that are sampled with a line-locked or a constant clock whose rates may deviate considerably from the display clock. The allowed deviation is determined by the bandwidth of the display memory DRAMs, display clock rate, number of input signals, and bandwidth and capacity of the buffers.

Also video signals having a different number of lines per field than is displayed on the screen (e.g., 60 Hz-NTSC and 50 Hz-PAL signals), are easily synchronized with the architecture. For, a different vertical offset of incoming video signals can be computed by the controllers of the architecture 4.5) at a field by field basis using very simple logic or by locking the DRAM-controllers to incoming signals when they access a specific DRAM.

Thus in accordance with the present invention, multi-source video synchronization with a single display memory arrangement is proposed. A significant reduction of synchronization memory is obtained when all video input signals are synchronized by one central "display" memory before they are display on the same monitor. The central display memory can perform this function, together with variable scaling and positioning of video images within the display memory. A composite multiwindow image is obtained by simply reading out the display memory.

A number of aspects are associated with the new approach:

1. A memory with very high-bandwidth is required when not only scaled windows must be shown on the display, but also cut-outs of parts of input images in windows, or a memory with many input ports. However, memories with many input ports do not exist.
2. If a standard and cheap memory is used, i.e., with only one I/O port, some means must be provided to accommodate the different write clocks of input signals and the read clock for display. In other words, additional synchronization of all writes and reads to the standard access-clock of the display memory is required.
3. To prevent access conflicts, read and write access must be scheduled to the memory such that read and multiple concurrent write accesses can be interleaved.
4. Due to down-scaling of input images, read and write address pointers will cross very often since the read and write rates are very different, giving rise to cut-line artifacts. In this case, using a field skip, by simply stopping the writing of a video input signal, will be insufficient.

Aspects 1–3

Figure 6:
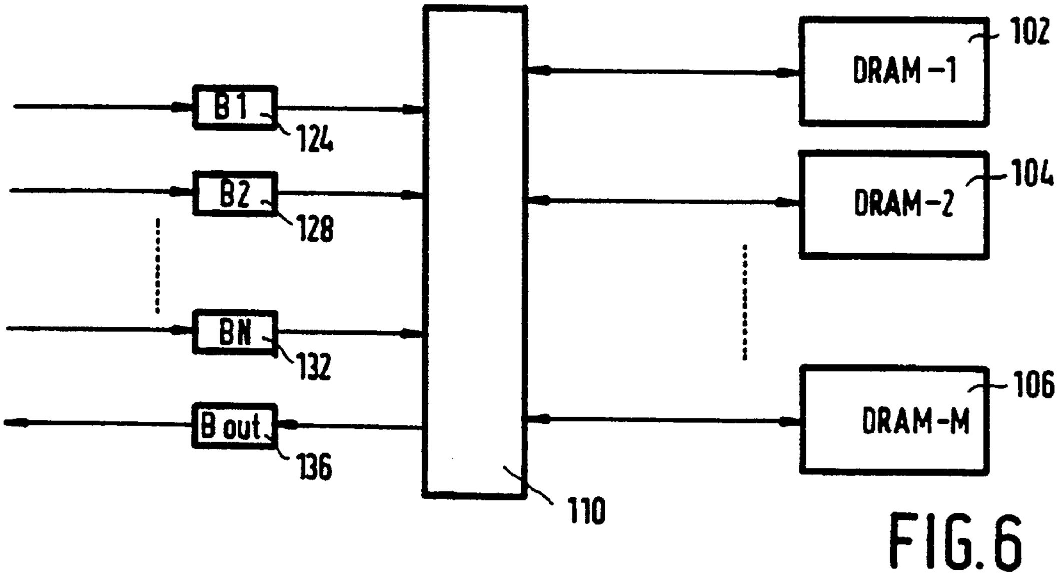
FIG. 6 shows a display memory architecture for multi-source video synchronization and window composition.

In copending U.S. patent application Ser. No. 08/483,918, filed Jun. 7, 1995, (Atty. docket PHN 14.791) claiming the same priority, a window compilation system has been described that allows multiple concurrent accesses of several video input signals. See FIG. 1 of that application and FIG. 3 of the present application. FIG. 6 shows another display memory architecture for multi-source video synchronization and window composition. This system comprises one central display memory comprising several memory banks DRAM-1, DRAM-2, . . . , DRAM-M that can be written and read concurrently using the communication network 110 and the input/output buffers 124–136. Buffers 124–132 are input buffers, while buffer 136 is an output buffer. The sum of the I/O bandwidths of the individual memory banks (DRAMs) 102–106 can be freely distributed over the input and output channels, hence a very high I/O bandwidth can be achieved (aspect 1).

Figure 7:
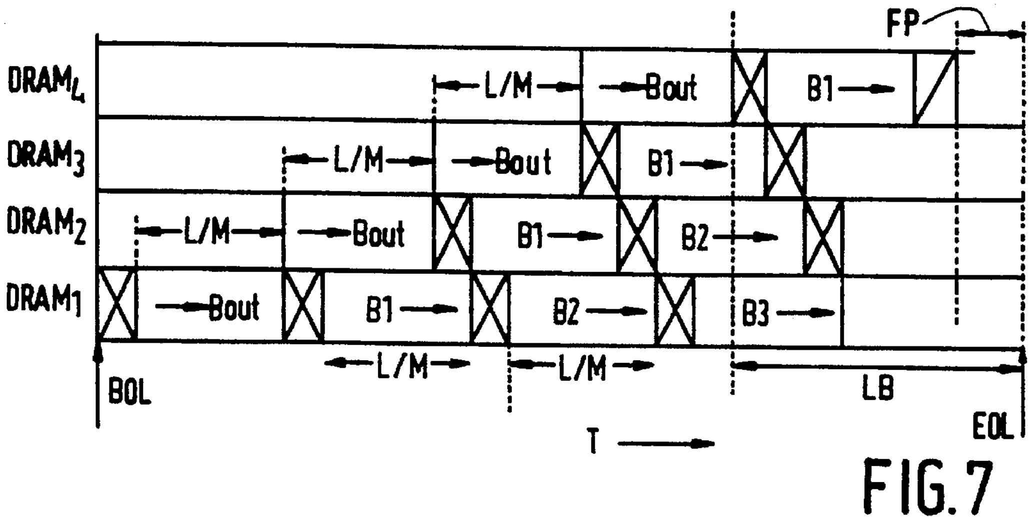
FIG. 7 shows time slots for accessing the display memory dung a video line, where L denotes the number of pixel access times per line and M=4 is the number of DRAMs.

FIG. 7 shows time slots for accessing the display memory during a video line, where L denotes the number of pixel access times per line and M=4 is the number of DRAMs. On the vertical axis, the accessed DRAMs are indicated. The horizontal axis indicates time T, starting from the begin BOL of a video line having L pixel-clock periods, and ending with the end EOL of the video line. Interval LB indicates the line blanking period. Interval FP indicates a free part of the line blanking period. Intervals L/M last L/M pixels. Intervals→ Bout indicate a data transfer to output buffer 136. Intervals Bx→indicate a data transfers from the indicated input buffer 124, 128 or 132. The crossed intervals indicate a DRAM page switch. FIG. 7 shows an example of possible access intervals to the different DRAMs of the display memory for reads and writes such that no access conflicts remain (aspect 3). These intervals can be chosen differently, especially if the input buffers are small SRAM devices with two I/O ports, such that the incoming video data can be read out in a different order than that it is written in. To implement the small I/O buffers with small SRAMs with two I/O ports and one or two addresses for input and output data is cost-effective. Just one address for either input or output is sufficient to allow for a different read/write order, while the other port is just a serial port. Note that also one DRAM can be used for the display memory if it is sufficiently fast (e.g., synchronous DRAM or Rambus DRAM as described by Fred Jones et at., "A new Era of Fast Dynamic RAMs", IEEE spectrum, pages 43–49, October 1992).

The "small" input buffers (approximately L/M to L pixels, where L is the number of pixels per line and M the number of DRAM memory modules in FIG. 6) take care of the sample rate conversion, allowing different read/write clocks (aspect 2). The write and read pixel rates may be different and also the number of pixels being written and read per field period may be different.

If the overall I/O bandwidth of the memory is not sufficient to accommodate for input video signals with a pixel rate higher than the display pixel rate, then the number of clock-cycles per line that no accesses occur to the display memory, the "free pan of blanking time in FIG. 7, can be used to perform additional writes to the display memory (and additional reads from the buffers). In case not a sufficient number of free clock-cycles remain in a line period, then a large time-slot (L/M pixel times, see FIG. 7) can be used within each line period if one of the input channels is removed in, e.g., FIG. 6.

Naturally, it is possible to stop the reading of pixels from the input buffers if the buffer gets empty due to a lower write than read rate. Yet another way to accommodate high write-access rates to the display memory is to choose the maximum access rate of the memory as the standard access clock-rate of the memory. In general, this access-rate will be higher than the maximum write-rate of video input signals. Also the display rate of the composite multiwindow video image will be lower than the standard access-rate of the memory. To compensate for this gap, an output buffer must be provided (capacity between a few pixels and a video line). Note however that in most practical systems, the system clock of the signal processing hardware is chosen the same as the display clock.

Vertical and also horizontal synchronization and positioning of video input images somewhere on the screen (and in the display memory), is achieved by synchronizing the address generators of the display memory to each incoming video signal, at the moment a communication channel is routed between a specific input buffer and the display memory during a predefined time interval. This is possible since only one video signal accesses (via a buffer) one of the DRAM segments in the display memory at the same time. One possible way to implement this, is by administrating a line/pixel counter for each video input signal, which can be consulted by the address generators to determine when and where in the memory access must take place.

Conclusion with regard to aspects 1–3

The input buffers are transparent to the input video signals, they only take care of sample-rate conversion, horizontal positioning and horizontal synchronization.

Buffers can be small FIFOs or multiport (static) RAMs (smaller than 1 video line).

Different interleaving strategies can be applied for the display memory: pixel by pixel, segments of pixels by segments of pixels or line by line, which still result in small input buffers as has been described by A. A. J. de Lange and G. D. La Hei, "Low-cost Display Memory Architectures for Full-motion Video and Graphics", IS&T/SPIE High-Speed Networking and Multimedia Computing Conference, San Jose, USA, Feb. 6–10, 1994.

Only one display memory is needed for all synchronization and multiwindow display.

The display memory can be a single DRAM with one I/O port only if it is sufficiently fast, or consist of a number of banks of DRAMs (DRAM segments), with one I/O port each, to increase the access rate of the display memory.

Also multiported DRAMs can also be used. In this case less DRAMs are required to achieve the same I/O bandwidth.

The DRAM I/O port can also be a serial port. It must however be row-addressable such is the case for Video RAM (VRAM).

If DRAMs of the display memory have a page-mode DRAM, this can be fully exploited.

A single FIFO cannot be used for synchronization of multiple video input signals, since (1) each input video signal must be written at a different address in the FIFO, depending on its screen position, and (2) address switching must be done at pixel or line basis to limit the size of input buffers.

The capacity of a buffer is in the order of 1/M-th of a line (M is the number of DRAMs in the display memory) up to a full video line for M-DRAM banks, see copending U.S. patent application Ser. No. 08/483,918, filed Jun. 7, 1995; (Atty. docket PHN 14.791).

According to FIG. 7, all input video signals can obtain access to the display memory during the complete line period, hence access is possible, independently of the differences between line and pixel positions between incoming and outgoing video signals.

Both horizontal and vertical synchronization and positioning can be obtained by synchronizing the address generators of the display memory DRAM-banks to the pixel/line positions of incoming video signals on the basis of the access-intervals, see e.g., FIG. 7, which typically occurs for segments of contiguous pixels, where the segment size varies between L/M and 2L (i.e. 2 video lines) pixels.

Control generators for input buffers are locked to the sync signals of the incoming video signals. They are not only locked to the pixel and line positions, but also to the pixel-clocks of the incoming video signals: one write-controller per input buffer.

Capacity of the display memory to prevent cut-lines (aspect 4) and to reduce the number of field-skips per second.

Single field display/synchronization memory

A problem occurs when the synchronization memory is also used to scale the input image. In this case, a single field memory is not sufficient to prevent cut-line artifacts. This situation also occurs when a different (FIFO) field memory is used for each input video signal. Namely, since input images are subsampled, all lines of an input image may be concentrated in only a small part of the field memory. Since it takes a complete field period to write only a few lines in case of high down-scaling factors, read/write addresses will cross each other in this part of the memory.

This problem disappears when an additional field memory is added; a field skip is made (writing is moved up to next field memory), whenever a cross is about to happen. This skip should be made before the field period starts in the incoming video signal, in which a cross would happen. Note that for multiple video input signals, a skip cannot be implemented by manipulating the read-address pointer, since such a manipulation could then introduce a cut-line artifact for another input video signal.

Frame display/synchronization memory

Cut-line artifacts can be prevented using a frame memory (2 fields): in case a cross of read/write address pointers is about to happen in the next field period, then writing of the new field is redirected to the same field-part of the frame memory, causing a field skip. Now, the ODD-field part of the frame memory is written with the EVEN field of the incoming video signal and the EVEN-field part of the frame memory is written with the ODD-field of the incoming video signal. To prevent interlace disorder in this case, field inversion is required which is implemented with a field dependent line delay. Note that such a line delay is easily implemented with the display memory by incrementing or decrementing the address generators of the display memory DRAMs with one line.

The disadvantage of this approach is the frequent up/down shifting of displayed images with one line for differences in pixel/line/field frequencies of only a few parts per thousand.

Figure 8:
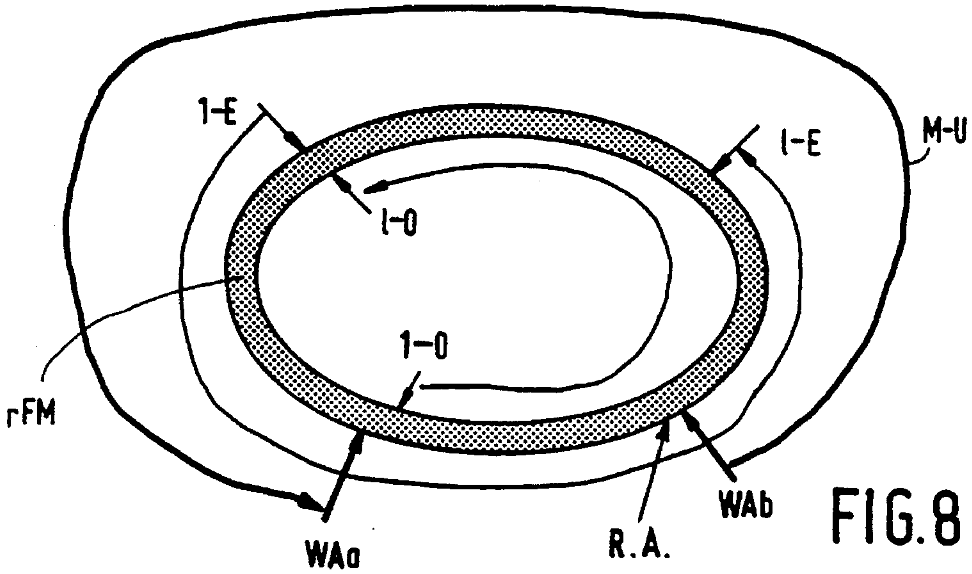
FIG. 8 shows a reduced frame memory with overlapping ODD/EVEN field sections.

Another possibility is to use a "reduced circular frame memory", i.e., the size of the display memory is smaller than two complete video fields and there is no fixed location for ODD and EVEN field parts, see FIG. 8. FIG. 8 shows a reduced frame memory rFM with overlapping ODD/EVEN field sections. The read address is indicated by RA. The first line of the even field is indicated by 1-E, while the last even field line is indicated by 1-E. The first line of the odd field is indicated by 1-O, while the last odd field line is indicated by 1-O. In this case, the position of ODD and EVEN field parts in the display memory is no longer fixed and ODD and EVEN field parts overlap each other. In case a "cross" is about to happen, the write pointer is moved-up in the display memory with one field, as indicated by the fat arrow M-U from write-address WAb before moveup until write address WAa after move-up. This action will not increase the distance between read/write addresses with a full field, but less than that due to the reduced frame memory rFM, see FIG. 8. As a result, the "cut-line" problem is solved, but arises again after a sufficient number of field periods have elapsed. Then again, a field-skip must be performed. Since the distance between read and write address pointers is less increased due to "move-up one field" in the reduced frame memory than occurs in the "full frame memory", the number of field-skips per second will be higher in the case of a reduced frame memory than it is in case of a full frame memory. The size of the reduced frame memory should be chosen sufficiently high to reduce the number of field-skips per second to an acceptable level. This is also highly dependent on the difference in pixel/line/field rates between the different video input signals and the reference signal. A logical result from this conclusion is that the display memory should consist of many frame memories to bring down the number of field-skips per second. On the other hand, the display memory can be reduced considerably if the differences in pixel, line, and field rates between incoming and outgoing signals is small enough to ensure that the number of field skips per second is low.

A good choice however, is to truncate the number of visible lines in a frame down to the number of rows in standard DRAMs with a maximum number of rows but smaller than the number of visible lines in a frame. E.g., 576 visible lines in a frame for CCIR 601, hence a DRAM with $2^{\text{integer}({}^2\log(576))}=2^{\text{integer}(9.17)}=2^{9}=512$ lines is a good choice.

FIG. 8 shows also an example what happens if the write address is moved-up with one field in the reduced frame memory.

Three field Memories

If the frequent up/down shifting due to field-inversion becomes annoying, another field memory can be added to allow for "frame-skips" instead of field-skips. This way no field inversion is required. Also in this memory, no fixed sectors are reserved for ODD and EVEN fields, but EVEN and ODD fields rotate along the memory, which is constructed as a circular memory as shown in FIG. 8, with the phase of the read-out address pointer.

Also in this case holds that either additional fields can be added to the display memory or a reduced 3-field display memory can be used (overall memory capacity is smaller than 3 full video fields), depending on the permissible number of "frame-skips" per second. However, note that a frame-skip does not give rise to up/down shifting, but only to "jerky" movement.

Again the actual size of the reduced 3-field memory can be chosen such that it matches well the number of rows in available memory devices (always 2^N, with N=1,2,3, . . . ).

Conclusion with regard to problem 4

1 field display memory introduces cut-lines for "downscaled images"

2 field display memory can be used to prevent cut-lines, but not up/down shifting of displayed input image with one line, due to field inversion 3 field display memory will prevent both cut-lines and up/down shifting Reduction of 2-field and 3-field display memory is possible to match the capacity of existing memory devices. However, the number of field skips per second (for reduced 2-field memory) and frame-skips (for reduced 3-field memory) is increased when the memory capacity is reduced.

Increase of display memory capacity will reduce the number of field and frame skips per second Address generation for circular display memories requires only simple modulo counters, adders/subtracters and/or comparators A field or frame skip is done by starting the WRITING of a new field of an incoming video signal (via an input buffer) in another part of the display memory, where the number of lines between read and write address pointers is increased with one field or frame. Note that for a circular reduced memory, increase of the distance between read and write will decrease the distance between write and read, see FIG. 8.

A field/frame skip is done when during the previous field/frame period a "cross" of read/write address pointers is predicted.

Prediction of a cross is simply implemented by monitoring the number of lines/pixels between read/write address pointers and the differential of the number of line/pixels between read/write pointers between subsequent video field/frame periods.

Overlay encoding

As has been mentioned in copending U.S. patent application Ser. No. 08,483,918, filed Jun. 7, 1995 (Atty. docket PHN 14.791) claiming the same priority, run-length encoding is preferably used to encode the overlay for multiple overlapping windows, each relating to a particular one of plurality of image signals. Coordinates of a boundary of a particular window and a number of pixels per video line failing within the boundaries of the particular window are stored. This type of encoding is particularly suitable for video data in raster-scan formats, since it allows sequential retrieval of overlay information from a run-length buffer. Run-length encoding typically decreases memory requirements for overlay-code storage, but typically increases the control complexity.

In case of a one-dimensional run-length encoding, a different set of run-lengths is created for each line of the compound image. For two-dimensional run-length encoding, run-lengths are made for both the horizontal and the vertical directions in the compound image, resulting in a list of horizontal run-lengths that are valid within specific vertical screen intervals. This approach is particular suitable for rectangular windows as is explained below.

A disadvantage associated with this type of encoding resides in a relatively large difference between peak performance and average performance of the controller. On the one hand, fast control generations are needed if events rapidly follows one another, on the other hand the controller is allowed to idle in the absence of the events. To somewhat mitigate this disadvantageous aspect, processing requirements for two-dimensional run-length encoding are reduced by using a small control instruction cache (buffer) that buffers performance peaks in the control flow. The controller in the invention comprises: a run-length encoded event table, a control signal generator for supply of control signals, and a cache memory between an output of the table and an input of the generator to store functionally successive run-length codes retrieved from the table. A minimal-sized buffer stores a small number of commands such that the control state (overlay) generator can run at an average speed. At the same time, the buffer enables the low-level high-speed control-signal generator to handle performance peaks when necessary. An explicit difference is made between low-speed complex overlay (control-state evaluation and high-speed control-signal generation. This is explained below.

Figure 9:
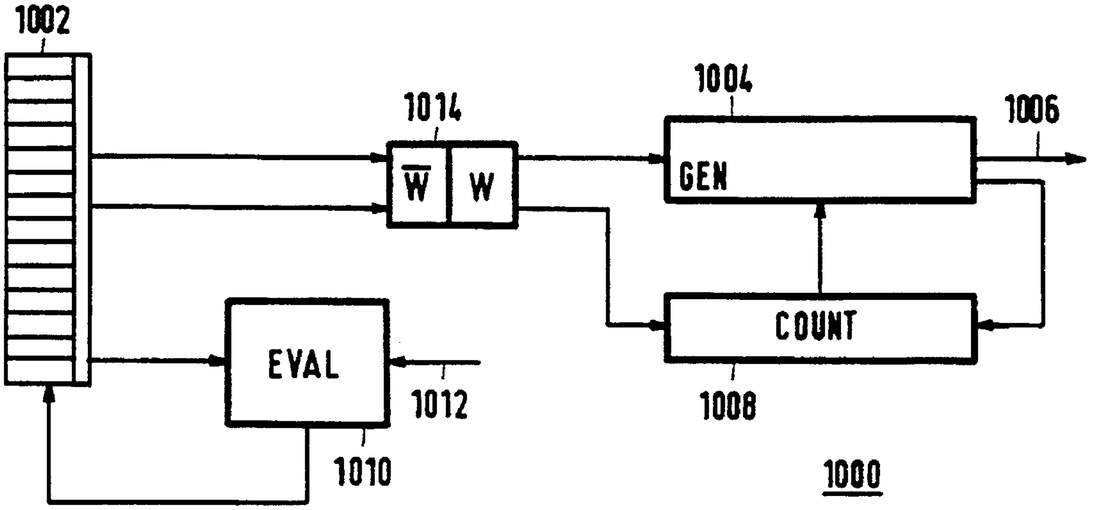
FIG. 9 shows an example of a controller.

FIG. 9 gives an example of a controller 1000 based on run-length encoding. Controller 1000 includes a run-length/event buffer 1002 that includes a table of two-dimensional run-length encoded events, e.g., boundaries of the visible portions of the windows (events) and the number of pixels and or lines (run-length) between successive events. In the raster-scan format of full-motion video signals, pixels are written consecutively to every next address location in the display memory of a monitor (not shown) connected to the output buffer 136, from the left to the right of the screen, and lines of pixels follow one another from top to bottom of the screen. Encoding is accomplished, for example, as follows.

The number of line Yb coinciding with a horizontal boundary of a visible portion of a particular rectangular window and first encountered in the raster-scan is listed, together with the number #W0 of consecutive pixels, starting at the left most pixel, is specified that not belong to the particular window. This fixes the horizontal position of the left hand boundary of the visible portion of the particular window. Each line Yj within the visible portion of the particular window can now be coded by dividing the visible part of line Yj in successive and alternate intervals of pixels that are to be written and are not to be written, thus taking account of overlap. For example, the division may result in a number #W1 of the first consecutive pixels to be written, a number #NW2 of the next consecutive pixels not to be written, a number #W3 of the following consecutive pixels to be written (if any), a number #NW4 of the succeeding pixels not to be written (if any), etc. The last line Yt coinciding with the horizontal boundary of the particular window or of a coherent part thereof and last encountered in the raster scan is listed in the table of buffer 1002 as well.

Buffer 1002 supplies these event codes to a low-level high-speed control generator 1004 that thereupon generates appropriate control signals, e.g., commands (read, write, inhibit) to govern input buffers 124, 128 or 132 or addresses and commands to control memory modules 102–106 or bus access control commands for control of communication network 110 via an output 1006. A run-length counter 1008 keeps track of the number of pixels still to go until the next event occurs. When counter 1008 arrives at zero run-length, generator 1004 and counter 1008 must be loaded with a new code and new run-length from buffer 1002.

Due to the raster-scan format of full-motion video signals, pixels are written consecutively to every next address location in the display memory of a monitor (not shown) connected to the output buffer 136, from the left to the right of the screen, and lines follow one another from top to bottom. A control-state evaluator 1010 keeps track of the current pixel and line in the display memory via an input 1012. Input 1012 receives a pixel address "X" and a line address "Y" of the current location in the display memory. As long as the current Y-value has not reached first horizontal boundary Yb of the visible part of the particular window, no action is triggered and no write or read commands are generated by generator 1004. When the current Y-value reaches Yb, the relevant write and not-write numbers #W and #NW as specified above are retrieved from the table in buffer 1002 for supply to generator 1004 and counter 1008. This is repeated for all Y-values until the last horizontal boundary Yt of the visible rectangular window has been reached. For this reason, the current Y-value at input 1012 has to be compared to the Yt value stored in the table of buffer 1002. When the current Y-value has reached Yt, the handling of the visible portion of the particular window constituted by consecutive lines is terminated. A plurality of values Yb and Yt can be stored for the same particular window, indicating that the particular window extends vertically beyond an overlapping other window. Evaluator 1010 then activates the corresponding new overlay/control state for transmission to generator 1004.

The control state can change very fast if several windows are overlapping one another whose left or fight boundaries are closely spaced to one another. For this reason, a small cache 1014 is coupled between buffer 1002 and generator 1004. The cache size can be minimized by choosing a minimal width for a window.

The minimal window size can be chosen such that there is a large distance (in the number of pixels) between the extreme edges of a window gap, i.e., the part of a window being invisible due to the overlap by another window. Now, if a local low-speed control-state evaluator 1010 is used for each I/O buffer 124, 128, 132 and 136 or for each memory module 102–106, then the transfer of commands should occur during the invisible pan of the window, i.e., during its being overlapped by another window. As a result, the duration of the transfer time-interval is maximized this way. The interval is at least equal to the number of clock cycles required to write a window having a minimal width. Two commands are transferred to the cache: one giving the run-length of the visible part of the window (shortest run-length) that starts when the current run-length is terminated, and one giving the run-length of the subsequent invisible part of the same window (longest run-length). The use of cache 1014 thus renders controller 1000 suitable to meet the peak performance requirements.

The same controller can also be used to control respective ones of the buffers 124–136 if the generator 1004 is modified to furnish a buffer write enable signals 1006.

Figure 10:
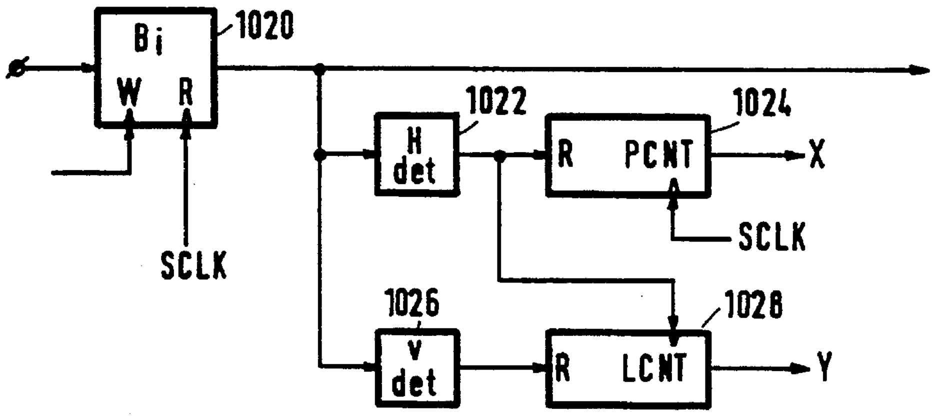
FIG. 10 shows a circuit to obtain X and Y address information from the dam stored in a buffer Bi.

FIG. 10 shows a circuit to obtain X and Y address information from the data stored in a buffer (Bi) 1020. Incoming video data is applied to the buffer 1020, whose write clock input W receives a pixel clock signal of the incoming video data. Readout of the buffer 1020 is clocked by the system clock SCLK applied to a read clock input R of the buffer 1020. A horizontal sync detector 1022 is connected to an output of the buffer 1020 to detect horizontal synchronization information in the buffer output signal. In a well known manner, the video data in the buffer 1020 includes reserved horizontal and vertical synchronization words. Detected horizontal synchronization information resets a pixel counter (PCNT) 1024 which is clocked by the system clock SCLK and which furnishes the pixel count X. A vertical sync detector 1026 is connected to the output of the buffer 1020 to detect vertical synchronization information in the buffer output signal. Detected vertical synchronization information resets a line counter (LCNT) 1028 which is clocked by the detected horizontal synchronization information and which furnishes the line count Y.

Figure 11:
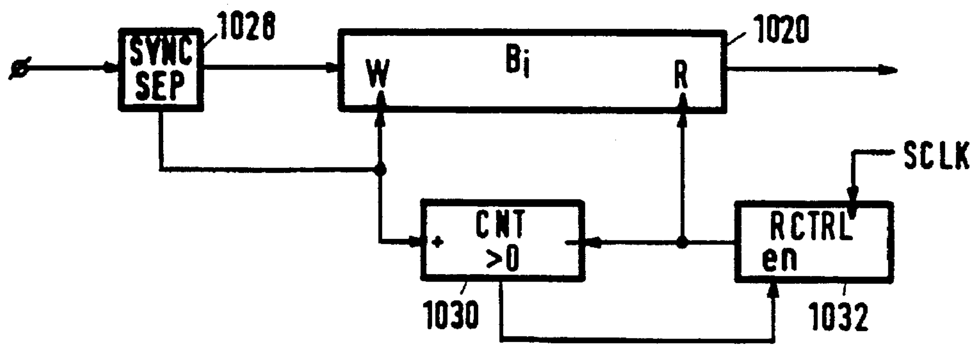
FIG. 11 shows a possible embodiment of a buffer read out control arrangement.

FIG. 11 shows a possible embodiment of a buffer read out control arrangement. The incoming video signal is applied to a synchronizing information separation circuit 1018 having a data output which is connected to the input of the buffer 1020. A pixel count output of the synchronizing information separation circuit 1018 is applied to the write clock input W of the buffer 1020 and to an increase input of an up/down counter (CNT) 1030. The system clock is applied to a read control (R CTRL) circuit 1032 having an output which is connected to the read clock input R of the buffer 1020 and to a decrease input of the counter 1030. The counter 1030 thus counts the number of pixels contained in the buffer 1020. To avoid buffer underflow, an output (>0) of the counter 1030 which indicates that the buffer is not empty, is connected to an enable input of the read control circuit 1032, so that the system clock SCLK is only conveyed to the read clock input R of the buffer 1020 if the buffer 1020 contains pixels whilst reading from the buffer 1020 is disabled if the buffer is empty. Overflow of the buffer 1020 can be avoided if the read segments shown in FIG. 7 are made slightly larger than L/M. It will be obvious from FIGS. 10, 11 that the shown circuits can be nicely combined into one circuit.

It should be noted that the above-mentioned embodiments illustrate rather than limit the invention, and that those skilled in the art will be able to design many alternative embodiments without departing from the scope of the appended claims.

I claim:

1. A system for synchronizing input video signals from a plurality of video sources, comprising:

means for buffering each respective one of said input video signals with mutually independent read and write operations, each write operation being locked to the corresponding video input signal, each read operation being locked to a system clock, said buffering means comprising a plurality of buffering units each corresponding to one of said video input signals and being substantially smaller than required to store a video signal field;

means for storing said input video signals to form a composite signal composed from said input video signals;

means for communicating data from said buffering units to said storage means; and means for supplying common pixel and line count signals to pixel and line addresses of said buffering means and said storing means.

2. A synchronizing system as claimed in claim 1, wherein said storing means comprise a plurality (M) of storage units having mutually independent write controllers which are individually connectable to said buffering means.

3. A synchronizing system as claimed in claim 1, further comprising a buffer read control arrangement comprising for each buffering unit a counter for signalling whether the buffering unit is empty to disable buffer read out.

4. A synchronizing system as claimed in claim 3, wherein said storing means comprise a plurality (M) of storage units and said buffer read control arrangement is adapted to furnish data segments which are slightly larger than the number (L) of pixels per video line divided by the number (M) of storage units contained in said storage means.

5. A synchronizing system as claimed in claim 1, wherein said storage means comprise a circular memory having a capacity sufficient for one video field but too small to contain two video fields, and wherein a write address of said storage means is moved up by one field during a vertical blanking period when a read address of said storage means is about to pass said write address.

6. A synchronizing system as claimed in claim 1, wherein said storage means comprise a circular memory having a capacity sufficient for two video fields but too small to contain three video fields, and wherein a write address of said storage means is moved up by one frame during a vertical blanking period when a read address of said storage means is about to pass said write address.

* * * * *